(12) United States Patent
Otsuka et al.

(10) Patent No.: US 8,136,995 B2
(45) Date of Patent: Mar. 20, 2012

(54) SEALING DEVICE AND ROLLING BEARING APPARATUS

(75) Inventors: Katsunori Otsuka, Kashiwara (JP); Takeshi Yamamoto, Izumisano (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 459 days.

(21) Appl. No.: 12/379,869

(22) Filed: Mar. 3, 2009

(65) Prior Publication Data
US 2009/0232433 A1   Sep. 17, 2009

(30) Foreign Application Priority Data

Mar. 4, 2008   (JP) ................. P2008-053487

(51) Int. Cl.
*F16C 33/72* (2006.01)
*F16J 15/00* (2006.01)
(52) U.S. Cl. ........ 384/477; 384/480; 277/410; 277/501; 277/919
(58) Field of Classification Search ................. 384/477, 384/480; 277/410, 919, 501
See application file for complete search history.

(56) References Cited

U.S. PATENT DOCUMENTS

| | | | | |
|---|---|---|---|---|
| 4,424,975 A | * | 1/1984 | Langebrake | 277/306 |
| 5,238,308 A | * | 8/1993 | Lang et al. | 384/1 |
| 5,379,169 A | | 1/1995 | Sanada | |
| 7,815,193 B2 | * | 10/2010 | Feistel et al. | 277/303 |
| 2009/0121440 A1 | | 5/2009 | Feistel et al. | |

FOREIGN PATENT DOCUMENTS

| | | |
|---|---|---|
| DE | 40 02 245 A1 | 8/1991 |
| FR | 2 563 583 A1 | 10/1985 |
| GB | 1026007 | 4/1966 |
| JP | 2006-64106 | 3/2006 |
| WO | 2006/042866 A1 | 4/2006 |

OTHER PUBLICATIONS

European Search Report dated Jul. 1, 2009.

* cited by examiner

*Primary Examiner* — William C Joyce
(74) *Attorney, Agent, or Firm* — McGinn IP Law Group, PLLC

(57) ABSTRACT

First portions are fixed to an outer ring, and second portions are fixed to an inner ring. Bimetal members and electromagnets are embedded in and fixed by elastic portions of the first portions and portions of the second portions are constituted by ferromagnetic members. Whereas at a normal temperature region, the first portions and the second portions are brought into contact with each other, based on deformations of the bimetal members at a temperature equal to or higher than a predetermined temperature equal to or higher than the normal temperature region, the first portions and the second portions are made to be disposed to be spaced apart from each other by intervals therebetween at a temperature equal to or higher than the predetermined temperature equal to or higher than the normal temperature region.

4 Claims, 2 Drawing Sheets

SEALING DEVICE AND ROLLING BEARING APPARATUS

BACKGROUND OF THE INVENTION

1. Field of the Invention

The present invention relates to a sealing device, particularly, relates to a sealing device preferable when used for sealing an interval between an outer ring and an inner ring of a rolling bearing rotatably supporting a main spindle of a machine tool.

Further, the invention relates to a rolling bearing apparatus including two race way members, a rolling element and a sealing device.

2. Related Art

In a background art, as a rolling bearing apparatus, there is a rolling bearing apparatus for a machine tool described in JP-A-2006-064106.

The rolling bearing apparatus rotatably supports a main spindle of a machine tool. The rolling bearing apparatus includes an outer ring, an inner ring, a plurality of rolling elements, and seal members of covering openings on both sides in an axial direction between the outer ring and the inner ring.

Whereas one end portion on an outer side in a diameter direction of a seal member is fixed to the outer ring, other end portion on an inner side in the diameter direction of the seal member is disposed relative to an outer peripheral face of the inner ring to be spaced apart from each other by an interval therebetween in the diameter direction. The other end portion of the seal member and the outer peripheral face of the inner ring constitute a labyrinth seal.

A main spindle of a machine tool is rotated at a high rotational speed of about several tens of thousands $min^{-1}$. According to the rolling bearing apparatus of the background art, by constituting the labyrinth seal, running cost is made to be small such that when the inner ring is rotated relative to the outer ring, a torque which is to be generated when the other end portion of the sealing device were brought into sliding contact with the inner ring is prevented from being generated.

SUMMARY OF THE INVENTION

The inventors have found that there poses the following problem in a rolling bearing apparatus having a large variation in a temperature between that when the apparatus is used and that when the apparatus is stopped as in a rolling bearing apparatus for a machine tool or the like.

That is, according to such a rolling bearing apparatus, when a temperature at inside of the bearing apparatus elevated when the apparatus is operated becomes low when the apparatus is stopped thereafter, a pressure at inside of the bearing apparatus becomes lower than a pressure at outside of the bearing apparatus, and an outside foreign matter flows to inside of the bearing apparatus.

Therefrom, a failure in lubrication is brought about by reducing a hardness of a lubricant at inside of the bearing or the like by the foreign matter invading from outside.

The problem becomes significant when the foreign matter invading inside when the apparatus is stopped is a water base mist (for example, when a working oil or the like is included). That is, in such a case, the water base mist is brought to between a rolling element and a raceway surface, and a failure in lubrication of the rolling element and the raceway surface is brought about.

Hence, a problem of the invention resides in providing a sealing device capable of reducing running cost by enabling to reduce a torque, further, having a large effect of preventing invasion of a foreign matter from outside based on an atmospheric pressure difference.

Further, a problem of the invention resides in providing a rolling bearing apparatus by which a foreign matter is difficult to invade inside from outside when the apparatus is stopped.

In order to resolve the above-described problem, a sealing device of the invention includes a current supplied portion and an interval adjusting portion for adjusting an interval between a first portion and a second portion by making the current supplied portion conductive or nonconductive.

According to the invention, the current supplied portion is included, and the interval adjusting portion of adjusting the interval between the first portion and the second portion by making the current supplied portion conductive or nonconductive is included, and therefore, the interval between the first portion and the second portion can pertinently be adjusted by pertinently supplying a current to the current supplied portion based on a specification.

For example, when the sealing device is installed to a bearing apparatus for supporting a main spindle of a machine tool, whereas when the machine tool is operated, the first portion is disposed to be spaced apart from the second portion by the interval by supplying a current to the current supplied portion, when the machine tool is stopped, the interval between the first portion and the second portion can be made to be null or a small interval by preventing the current from being supplied to the current supplied portion. Therefore, a torque in operating the machine tool can be reduced, at the same time, when the machine tool is stopped, invasion of a foreign matter to inside of the bearing apparatus from outside of the bearing apparatus can remarkably be restrained in comparison with the labyrinth seal of the background art.

Further, according to an embodiment, the current supplied portion includes an electromagnet constituting at least a portion of the first portion;

wherein the interval adjusting portion includes the electromagnet, a ferromagnetic member constituting at least a portion of the second portion, and an elastic portion constituting a portion of at least one of the first portion and the second portion.

According to the above-described embodiment, by pertinently supplying the current to the electromagnet by the specification, a pertinent force can be generated between the electromagnet and the ferromagnetic member portion, and the electromagnetic member portion can pertinently be deformed to a desired shape. Therefore, desired seals can be realized for respective specifications.

For example, when the sealing device is installed to a rolling bearing apparatus for supporting a main spindle of a machine tool, whereas when the machine tool is operated, the first portion and the second portion are pulled to separate by generating an attractive force between the electromagnet and the ferromagnetic member portion by supplying the current to the electromagnet, when the machine tool is stopped, the interval between the first portion and the second portion can be made to be null or a small interval by making the first portion and the second portion proximate to each other by releasing the attractive force between the electromagnet and the ferromagnetic member portion by stopping to supply the current to the electromagnet. Therefore, a torque in operating the machine tool can be reduced, at the same time, when the machine tool is stopped, a function of preventing a foreign matter from invading inside from outside can be enhanced.

Further, according to an embodiment, the current supplied portion includes a piezoelectric element constituting a portion of the first portion;

wherein the interval adjusting portion includes the piezoelectric element.

According to the above-described embodiment, by pertinently supplying a current to the piezoelectric element for respective specifications, the interval between the first portion and the second portion can pertinently be adjusted for respective specifications.

For example, when the sealing device is installed to a rolling bearing apparatus for supporting a main spindle of a machine tool, whereas in operating the machine tool, the first portion and the second portion are pulled to separate by deforming the piezoelectric element by supplying the current to the piezoelectric element, when the machine tool is stopped, the interval between the first portion and the second portion can be made to be null or a small interval by making the first portion and the second portion proximate to each other by constituting a shape of the piezoelectric element by a shape inherently provided to the piezoelectric element by stopping to supply the current to the piezoelectric element. Therefore, a torque in operating the machine tool can be reduced, at the same time, a function of preventing a foreign matter from invading inside from outside can be enhanced when the machine tool is stopped.

Further, according to an embodiment, an interval between the first portion and the second portion in making the current supplied portion conductive is larger than an interval between the first portion and the second portion in making the current supplied portion nonconductive.

According to the above-described embodiment, for example, by supplying the current to the current supplied portion when the machine having the sealing device is operated, a sealing property when the machine is stationary can be made to be more excellent than a sealing property when the machine is operated. Therefore, a foreign matter can remarkably be restrained from invading inside from outside of the sealing device when the machine is stopped.

Further, according to an embodiment, the interval adjusting portion includes a bimetal member constituted by bonding a first expansion member in a plate-like shape having a first thermal expansion coefficient and a second expansion member in a plate-like shape having a second thermal expansion coefficient different from the first thermal expansion coefficient and constituting a portion of at least one of the first portion and the second portion;

wherein the bimetal member is deformed to increase the interval between the first portion and the second portion when a temperature of the bimetal member is elevated, further including:

a temperature measuring portion of measuring the temperature of the bimetal member;

wherein a current supplied to the current supplied portion when the temperature measured by the temperature measuring portion is smaller than a predetermined temperature is larger than a current supplied to the current supplied portion when the temperature measured by the temperature measuring portion is equal to or larger than the predetermined temperature.

Further, the words of measuring the temperature of the bimetal member includes not only a case of directly fixing the temperature measuring portion to the bimetal member but a case of fixing the temperature measuring portion to a portion at a surrounding of the bimetal member. Because in this case, the temperature of the bimetal member can indirectly be known based on a temperature at the portion of the surrounding of the bimetal member.

According to the embodiment, when a machine having the sealing device is operated, by utilizing a temperature rise of the bimetal member, a function of increasing the interval between the first member and the second member can be promoted.

Further, according to the embodiment, when the temperature of the bimetal member is equal to or larger than the predetermined temperature, the current supplied to at least one of the first portion and the second portion can be reduced, and therefore, a running cost of the machine having the bimetal member can be reduced.

Further, a rolling bearing apparatus of the invention is characterized in including:

a first raceway member having a raceway surface;

a second raceway member having a raceway surface;

a plurality of rolling elements arranged between the raceway surface of the first raceway member and the raceway surface of the second raceway member; and the sealing apparatus of the invention;

wherein the first portion constitutes a portion of the first raceway member or fixed to the first raceway member; and wherein the second portion constitutes a portion of the second raceway member, or fixed to the second raceway member.

According to the invention, the sealing device of the invention is provided, and therefore, a sealing property of the sealing apparatus can be made to be a desired sealing property pertinently based on the specification.

For example, when a machine installed with the rolling bearing apparatus is operated, a torque owing to the sealing device can be reduced by reducing the sealing property of the sealing device, further, when the machine is stopped, a function of restraining a foreign matter from flowing to inside from outside can be enhanced by enhancing the sealing property of the sealing device.

According to the sealing device of the invention, the current supplied portion is included, the interval adjusting portion of adjusting the interval between the first portion and the second portion by making the current supplied portion conductive or nonconductive is provided, and therefore, by pertinently supplying the current to the current supplied portion for respective specifications, the interval between the first portion and the second portion, that is, the sealing property of the sealing device can pertinently be adjusted.

Further, according to the rolling bearing apparatus of the invention, the sealing property of the sealing device can be made to be a desired sealing property pertinently for respective specifications.

DETAILED DESCRIPTION OF THE PREFERRED EMBODIMENTS

The invention will be described in details by an illustrated mode as follows.

Figure 1:
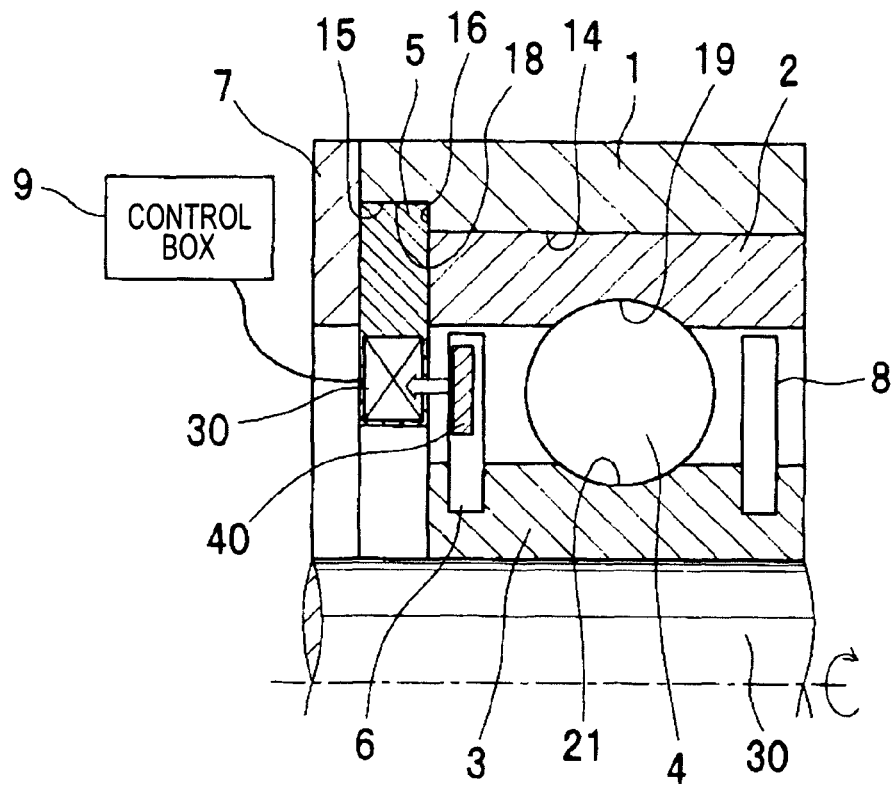
FIG. 1 is a schematic sectional view in an axial direction of a ball bearing apparatus according to a first embodiment of the invention.

FIG. 1 is a schematic sectional view in an axial direction of a ball bearing apparatus according to a first embodiment of the invention.

The ball bearing apparatus includes an axle box 1, an outer ring 2, an inner ring 3 as a second raceway member, a plurality of balls 4 constituting a plurality of rolling elements, a sealing device, a ring-like member 7, and a seal member 8, and the sealing device includes a first portion 5, a second portion 6, and a control box 9 as a control portion.

An inner peripheral face of the axle box 1 includes a first circular cylinder inner peripheral face 14, and a second circular cylinder inner peripheral face 18 concentric with the first circular cylinder inner peripheral face 14 and having a diameter larger than that of the first circular cylinder inner peripheral face 14. The second circular cylinder inner peripheral face 18 is disposed on one side in the axial direction of the first circular cylinder inner peripheral face 14. The second circular cylinder inner peripheral face 18 is opened in the axial direction at an end face of the axle box 1. The second circular cylinder inner peripheral face 18 is connected to the first circular cylinder outer peripheral face 14 by way of a side face 16 widening substantially in a diameter direction.

An outer peripheral face of the outer ring 2 is fitted to the first circular cylinder inner peripheral face 14 of the axle box 1 by running fit. The outer ring 2 includes a raceway groove 19 as a raceway surface at an inner peripheral face thereof. An end face on a side of the second circular cylinder inner peripheral face 18 in the axial direction of the outer ring 2 and the side face 16 are disposed substantially on the same plane.

The ring-like member 7 is a member in a shape of a circular plate and includes a first end face and a second end face in the axial direction. The first end face and the second end face are in parallel with each other and extended substantially in a diameter direction of the ring-like member 7. The first end face of the ring-like member 7 is brought into contact with an outermost end face on a side of the second circular cylinder inner peripheral face in the axial direction of the axle box 1. The ring-like member 7 is fixed to the axle box 1 by a fastening member of a screw, a bolt or the like. An inner peripheral face of the ring-like member 7 is disposed on an inner side in the diameter direction of the inner peripheral face of the second circular cylinder inner peripheral face 18. The second circular cylinder inner peripheral face 18 and the side face 16 of the axle box 1, the end face on the side of the second circular cylinder inner peripheral face 18 and the first end face of the ring-like member 7 specify a first portion attaching groove in a ring-like shape. The axle box 1, the outer ring 2 and the ring-like member 7 constitute a first raceway member.

The inner ring 3 is fixed to an outer peripheral face of a rotating shaft 30 by tight fit. An outer peripheral face of the inner ring 3 includes a raceway groove 21 as a raceway surface. Further, the outer peripheral face of the inner ring 2 includes a second portion attaching groove in a ring-like shape and a seal member attaching groove in a ring-like shape. Whereas the second portion attaching groove is disposed on a side of the ring-like member 7 of the raceway groove 21 in the axial direction, the seal member attaching groove is disposed on a side opposed to the side of the ring-like member 7 of the raceway groove 21 in the axial direction.

The plurality of balls 4 are arranged to be spaced apart from each other by intervals there among in a state of being retained by a retainer (not illustrated) between the raceway groove 19 of the outer ring 2 and the raceway groove 21 of the inner ring 3.

The first portion 5 includes an elastic portion made of rubber constituting a main body portion and an electromagnet 30 constituting an example of a current detected portion. The first portion 5 is provided with a shape in a shape of a circular plate. An end portion on an outer side in the diameter direction of the first portion 5 is fitted to and fixed by a first portion attaching groove. The first portion 5 includes a projected portion projected to an inner side in the diameter direction of the inner peripheral face of the outer ring 1. The electromagnet 30 is embedded in and fixed by an inner portion of the projected portion.

The second portion 6 includes an elastic portion made of rubber constituting a main body portion and a ferromagnetic member portion 40 comprising a ferromagnetic member. The second portion 6 is provided in a shape of a circular plate. An end portion on an inner side in the diameter direction of the second portion 6 is fitted to and fixed by the second portion attaching groove of the inner ring 3. A diameter direction outer side portion disposed on an outer side in the diameter direction of the second portion 6 overlaps the projected portion of the first portion 5 in the axial direction. The diameter direction outer side portion includes the elastic portion and the ferromagnetic member portion 40 arranged at an inner portion of the elastic portion. The ferromagnetic member portion 40 is provided with a portion overlapping the electromagnet 30 of the first portion 5 in the axial direction. Substantially a total of the ferromagnetic member 40 overlaps the electromagnet 30 in the axial direction. The electromagnet 30, the ferromagnetic member 40, the elastic portion of the first portion 5 and the elastic portion of the second portion 6 constitute an interval adjusting portion.

The seal member 8 is provided in a shape of a circular plate. An end portion on an inner side in the diameter direction of the seal member 8 is fitted to and fixed by the seal member attaching groove. An end face on an outer side in the diameter direction of the seal member 8 is opposed to the inner peripheral face of the outer ring 2 by way of a small clearance. The seal member 8 and the inner peripheral face of the outer ring 2 constitute a labyrinth seal.

The control box 9 includes a microcomputer as the control portion and a current driver as a current supply portion. The current driver and the electromagnet 30 are electrically connected by a wiring.

The microcomputer makes the current driver supply a current to the electromagnet 30 when rotation of the inner ring 3 relative to the outer ring 2 is recognized by receiving a signal from a rotational speed sensor, not illustrated.

Then, an attractive force is operated between the electromagnet 30 and the ferromagnetic member 40, an interval between the electromagnet 30 and the ferromagnetic member 40 becomes short, an interval between the first portion 5 and the second portion 6 becomes short, and a sealing property of the sealing device is promoted.

According to the sealing device of the first embodiment, the first portion 5 and the second portion 6 include the interval adjusting portion of varying the shortest distance of the first portion 5 and the second portion 6 when the current is supplied to the first portion 5, and therefore, by supplying the current to the first portion 5, the interval between the first portion and the second portion can pertinently be adjusted.

In details, according to the sealing device of the first embodiment, in a state of operating the ball bearing apparatus, the distance between the first portion 5 and the second portion 6 can be made to be small and the sealing property of the sealing device can be promoted.

The sealing device of the first embodiment is preferably installed to, for example, a ball bearing apparatus having a specification in which a lubricant is liable to leak to outside of the bearing at a high temperature region. Because when the sealing device of the first embodiment is installed, even when a fluidity of a lubricant is increased by reducing a viscosity of the lubricant owing to a rise in a temperature of the lubricant, the lubricant can be restrained from being leaked to outside of the bearing.

Further, although according to the first embodiment, the sealing device is used as the sealing device of the roller bearing in which the rolling element is a ball 4, the sealing device of the invention may be used as a sealing device of a rolling bearing apparatus in which a rolling element thereof is a rolling element other than a ball of a circular cone roller, a circular cylinder roller, a barrel shape roller (projected face roller), a needle or the like. Further, the sealing apparatus of the invention may be used as a sealing device of an apparatus other than a rolling bearing of a linear apparatus or the like.

Further, although according to the first embodiment, the sealing device is arranged only on one side in the axial direction of the ball 4, the sealing devices of the invention may be arranged on both sides in the axial direction of the rolling member.

Further, although according to the first embodiment, when the ball bearing apparatus is stopped, the first portion 5 and the second portion 6 are disposed to be spaced apart from each other by the interval therebetween, according to the invention, when the ball bearing apparatus is stopped, the first portion and the second portion may be brought into contact with each other.

In a case of bringing the first portion 5 and the second portion 6 into contact with each other when the ball bearing apparatus is stopped or in a state of operating the ball bearing apparatus in this way, it is preferable to constitute at least a surface of one of the first portion 5 and the second portion 6 at contact portions of the first portion 5 and the second portion 6 by a metal material to reduce a resistance thereof in sliding the elastic portion made of rubber on other side. Further, the ferromagnetic member 40 may be constituted by a metal material, a surface thereof may be exposed to an outer side in the axial direction of the second portion 6 and the surface may be brought into contact with the elastic portion made of rubber of the first portion 5.

In the case of the modified example, in a low temperature state in which a viscosity of a lubricant is large, and a large contact face pressure or a contact area of the first portion and the second portion is not needed, the contact face pressure or the contact area of the first portion and the second portion can be reduced, and a rotational torque owing to the contact face pressure or the contact area can be reduced. Therefore, in the low temperature state, fuel cost of a machine having the sealing device of the modified example can be improved. Further, conversely, in a high temperature state, the contact face pressure or the contact area of the first portion and the second portion can be increased, and therefore, in the high temperature state, even when the fluidity of the lubricant is increased by reducing the viscosity of the lubricant owing to the rise of the temperature of the lubricant, the lubricant can be restrained from being leaked to outside of the bearing.

Further, in this case, although the interval of the first portion and the second portion is always null, and only the face pressure or the area of the contact portion of the first portion and the second portion in the high temperature region is larger than the face pressure or the area of the contact portion of the first portion and the second portion at the low temperature region, even a case in which the interval of the first portion and the second portion is null and the contact face pressure or the contact area of the contact portion is varied in this way is included in the invention.

Further, although according to the first embodiment, the outer ring 2 constitutes a stationary ring and the inner ring 3 constitutes a rotating ring, according to the invention, the outer ring may be constituted by the rotating ring and the inner ring may be constituted by the stationary ring.

Figure 2:
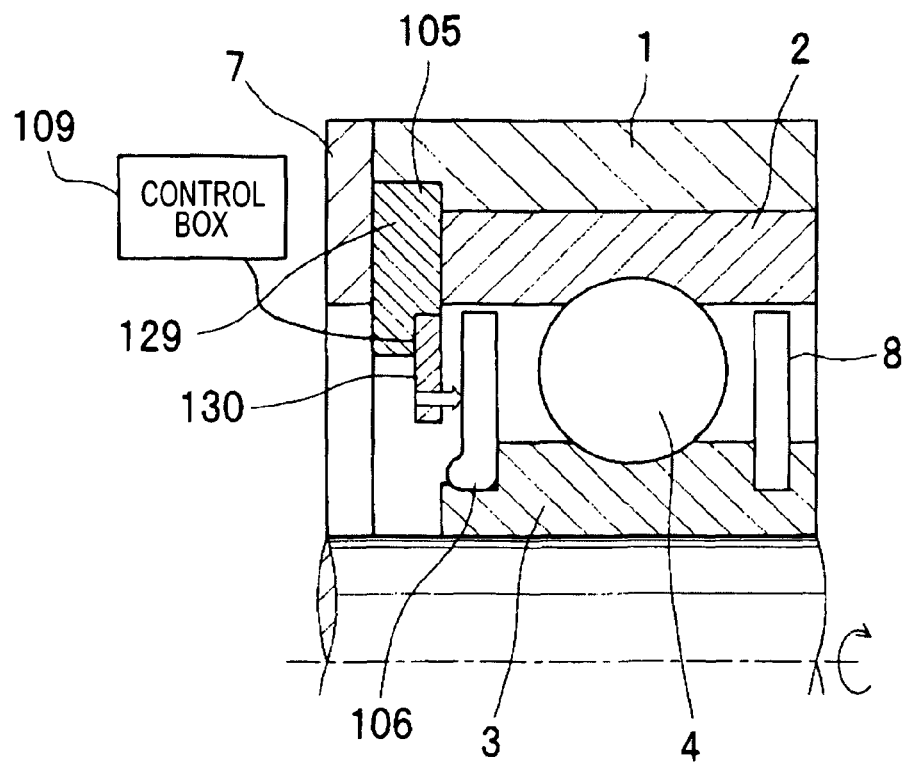
FIG. 2 is a schematic sectional view in an axial direction of a ball bearing apparatus according to a second embodiment of the invention.

FIG. 2 is a schematic sectional view in an axial direction of a ball bearing apparatus according to a second embodiment of the invention.

According to the ball bearing apparatus of the second embodiment, constituent portions the same as constituent portions of the ball bearing apparatus of the first embodiment are attached with the same reference numerals and an explanation thereof will be omitted. Further, according to the ball bearing apparatus of the second embodiment, an explanation of an operation and an effect and a modified example common to those of the ball bearing apparatus of the first embodiment will be omitted, and an explanation will be given only of a constitution, an operation, an effect and a modified example different from those of the ball bearing apparatus of the first embodiment.

The second embodiment differs from the first embodiment in that whereas a first portion 105 fixed to a first raceway member is not provided with an electromagnet, a piezoelectric element 130 is provided at an end portion on an inner side in a diameter direction and on an inner side in an axial direction, and the piezoelectric element 130 is extended substantially in the diameter direction by being projected to the inner side in the diameter direction from a metal portion 129 constituting a main body of the first portion 105, and that a second portion 106 fixed to the inner ring 3 is a shield plate made of a metal comprising a single material.

According to the second embodiment, a current driver of a control box 109 is electrically connected to the piezoelectric element 130 of the first portion 105 by a wiring. According to the second embodiment, when a microcomputer of the control box 109 recognizes rotation of the inner ring 3 relative to the outer ring 2 by receiving a signal from a rotational speed sensor, not illustrated, the microcomputer makes the current driver supply a predetermined current to the piezoelectric element 130.

Then, the piezoelectric element 130 is bent to an inner side in an axial direction by a predetermined current (predetermined voltage) supplied as descried above, a distance between the piezoelectric element 130 and the second portion 106 becomes short, owing thereto, the distance between the first portion 105 and the second portion 106 becomes short, and a sealing property of a sealing device is promoted. The piezoelectric element 130 constitutes a current supplied portion and constitutes an interval adjusting portion.

Figure 3:
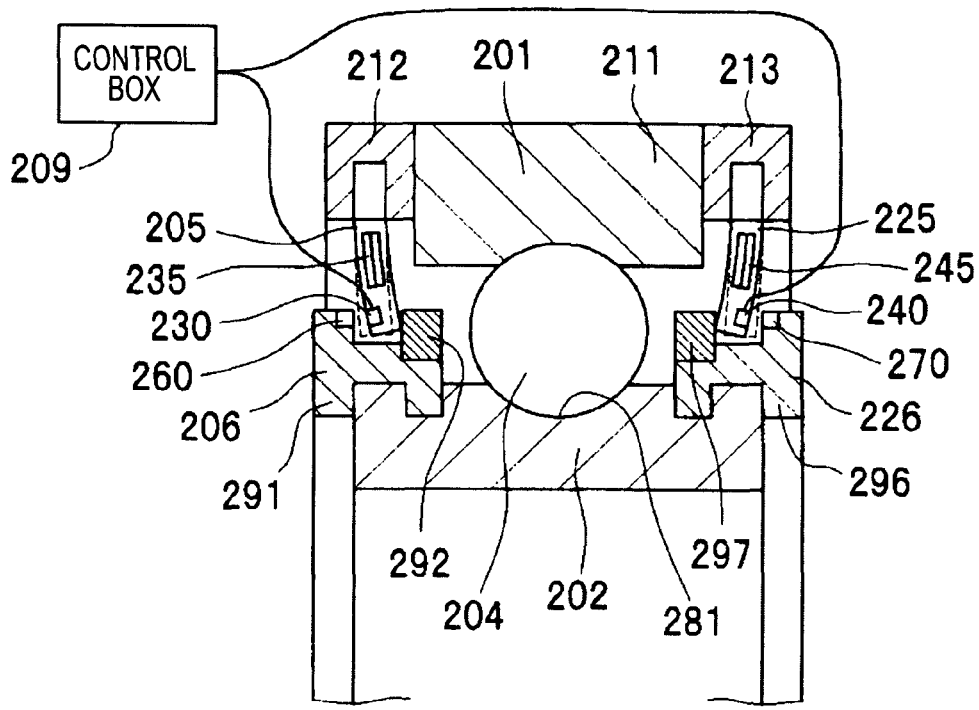
FIG. 3 is a schematic sectional view in an axial direction of a ball bearing apparatus according to a third embodiment of the invention.

FIG. 3 is a schematic sectional view in an axial direction of a ball bearing apparatus according to a third embodiment of the invention.

The ball bearing apparatus rotatably supports a main spindle of a machine tool, not illustrated. The ball bearing apparatus includes an outer ring 201 as a first raceway member, an inner ring 202 as a second raceway member, a plurality of balls 204, a first first portion 205, a second first portion 225, a first second portion 206, a second second portion 226, and a control box 209.

The outer ring 201 includes an outer ring main body 211 in a ring-like shape and substantially in a circular cylinder shape, a first sealing device fixing member 212 in a ring-like shape and substantially in a circular cylinder shape, and a second sealing device fixing member 213 in a ring-like shape and substantially in a circular cylinder shape. The first sealing device fixing member 212 is the same as the second sealing device fixing member 213. An end face on one side in an axial direction of the first sealing device fixing member 212 is brought into contact with an end face on other side in the axial direction of the outer ring main body 211, and an end face on other side in the axial direction of the second sealing device fixing member 213 is brought into contact with an end face on one side in the axial direction of the outer ring main body 211.

The first sealing device fixing member 212 and the second sealing device fixing member 213 are respectively fixed to the outer ring main body 211 by fastening members of bolts (not illustrated) or the like. Whereas the outer ring main body 211 includes a raceway groove as an example of a raceway face at an inner periphery thereof, the first sealing device fixing member 212 and the second sealing device fixing member 213 respectively include first portion attaching grooves in a ring-like shape.

The first first portion 205 is provided with a shape in a ring-like shape and in a circular plate shape. The first first portion 205 is fitted to and fixed by the first portion attaching groove of the first sealing device fixing member 212.

The first first portion 205 includes an elastic portion made of rubber constituting a main body portion, an electromagnet 230 formed substantially in a ring-like shape, and a bimetal member 235 formed in a ring-like shape, and the electromagnet 130 and the bimetal member 235 are respectively arranged at the elastic portion in a ring-like shape along a peripheral direction of the first first portion 205 and substantially concentrically embedded to be fixed to the elastic portion.

The electromagnet 130 is embedded to be arranged to an inner side in a diameter direction and an outer side in an axial direction of the first portion 205. On the other hand, the bimetal member 235 is constituted by bonding a low expansion member and a high expansion member in a plate-like shape having different thermal expansion coefficients. Whereas the low expansion member is constituted by a low expansion material of, for example, 36 through 46% Ni—Fe alloy or the like, the high expansion member is constituted by a high expansion material of, for example, Cu, Ni, 70% Cu—Zn, 70% Cu—Zn alloy, 20% Ni—Mn—Fe alloy, Ni—Cr—Fe alloy, 20% Ni—Mo—Fe alloy, 70% Mn—Ni—Cu alloy or the like. An expansion degree of the bimetal member 235 is made to be able to be changed by changing respective metal compositions of the low expansion member and the high expansion member to be bonded. The bimetal member 235 is gradually opened by thermal expansion in accordance with a temperature to exert a force to the first first portion 205.

The high expansion member and the low expansion member are respectively ring-like members and extended substantially in the diameter direction of the outer ring main body 211. The bimetal member 235 is constituted by bonding an end face in the axial direction of the high expansion member and an end face in the axial direction of the low expansion member. The bimetal member 235 is arranged on an inner side in the diameter direction of an outermost portion in the diameter direction of the first sealing device fixing member 212 and on an outer side in the diameter direction of the electromagnet 230. The low expansion member constitutes a first thermal expansion member, and the high expansion member constitutes a second thermal expansion member.

On the other hand, the second first portion 225 is provided with the shape in a ring-like shape and a circular plate shape. The second first portion 225 is fitted to and fixed by the first portion attaching groove of the second sealing device fixing member 213.

The second first portion 225 includes an elastic portion made of rubber constituting a main body portion, an electromagnet 240 formed substantially in a ring-like shape, and a bimetal member 245 formed in a ring-like shape, and the electromagnet 240 and the bimetal member 245 are arranged in a ring-like shape along a peripheral direction of the second first portion 225 to be substantially concentrically embedded to be fixed to the elastic portion.

The electromagnet 240 is embedded to be arranged on an inner side in the diameter direction and on an outer side in an axial direction of the second first portion 225. On the other hand, the bimetal member 245 is constituted by a low expansion member and a high expansion member in a plate-like shape having different thermal expansion coefficients. Whereas the low expansion member is constituted by a low expansion material of, for example, 36 through 46% Ni—Fe alloy or the like, the high expansion member is constituted by a high expansion material of, for example, Cu, Ni, 70% Cu—Zn, 70% Cu—Zn alloy, 20% Ni—Mn—Fe alloy, Ni—Cr—Fe alloy, 20% Ni—Mo—Fe alloy, 70% Mn—Ni—Cu alloy or the like. An expansion degree of the bimetal member 245 is made to be able to be changed by changing respective metal compositions of the low expansion member and the high expansion member to be bonded. The bimetal member 245 is gradually opened by thermal expansion in accordance with a temperature to exert a force to the second first portion 235.

The high expansion member and the low expansion member are respectively ring-like members and extended substantially in the diameter direction of the outer ring main body 211. The bimetal member 245 is constituted by bonding an end face in the axial direction of the high expansion member an end face in the axial direction of the low expansion member. The bimetal member 245 is arranged on an inner side in a diameter direction of an outermost portion in the diameter direction of the second sealing device fixing member 213 and on an outer side in the diameter direction of the electromagnet 240. The low expansion member constitutes a first thermal expansion member and the high expansion member constitutes a second thermal expansion member.

The inner ring 202 includes a raceway groove as an example of a raceway face and two second portion fixing grooves at an outer peripheral face thereof. Whereas the second portion fixing groove on one side is disposed on one side in an axial direction of the raceway groove 281, the second portion fixing groove on other side is disposed on other side in the axial direction of the raceway groove 281.

The first second portion 206 is a ring-like member and includes an elastic portion 291 made of rubber constituting a main body portion, a sliding contact portion 292 in a ring-like shape and made of a metal fixed to the elastic portion 291, and a ferromagnetic member 260 formed in a ring-like shape, and is provided with a shape of a section substantially in an H-like shape in a section in an axial direction. In details, the first second portion 206 includes two circular plate portions substantially in the shape extended in a diameter direction, and a connecting portion of connecting the two circular plate portions. The two circular plate portions are arranged to be spaced apart from each other by an interval therebetween in the axial direction substantially in a parallel state and to substantially overlap each other substantially in the axial direction. On the other hand, the connecting portion is provided with a shape substantially in a shape of a circular cylinder. The connecting portion connects a center portion in the diameter direction of the circular plate portion on one side and a center portion in the diameter direction of the circular plate portion on other side.

A portion on an inner side in the diameter direction of the connecting portion of the circular plate portion on one side (circular plate portion on inner side in axial direction) is fitted to and fixed by the second portion fixing groove on one side of the inner ring 202, and an inner peripheral face of the connecting portion is brought into contact with an outer peripheral face portion of the inner ring 202 disposed on an outer side in the axial direction of the second portion fixing groove on the one side of the inner ring 202. A portion on one side in the diameter direction of the circular plate portion on one side constitutes the sliding contact portion 292 made of a metal. The sliding contact portion 292 made of a metal is fixedly attached to the elastic portion 291 to integrate a portion of being fitted to the second portion fixing groove on the one side and the connecting portion. Further, an end face in the axial direction on a side of the connecting portion of a portion on an inner side in the diameter direction of the connecting portion of the other circular plate portion is brought into contact with an end face on other side in the axial direction of the inner ring 202.

The ferromagnetic member 260 arranged in a ring-like shape along a peripheral direction of the first second portion 206 is embedded in and fixed by an end portion on an outer side in the diameter direction and on an inner side in the axial direction of the other circular plate portion of the first second portion 206.

As shown by FIG. 3, the end portion on the inner side in the diameter direction of the first first portion 205 is contained in a recess portion on an outer side in the diameter direction of the first second portion 206. The bimetal member 235 of the first first portion 205 is bent to the inner side in the axial direction at a normal temperature range (20° C.±15° C.).

As shown by FIG. 3, a portion on the inner side in the axial direction of the end portion on the inner side in the diameter direction of the first first portion 205 is brought into contact with an end face of a portion on an inner side in the axial direction of the first second portion 206 specifying the recess portion at the normal temperature range. The portion on the inner side in the axial direction of the end portion on the inner side in the diameter direction of the first first portion 205 is brought into contact with an end face on the outer side in the axial direction of the sliding contact portion 292 made of a metal.

On the other hand, the second second portion 226 is a ring-like member, including an elastic portion 296 made of rubber constituting a main body portion, a sliding contact portion 297 in a ring-like shape and made of a metal fixed to the elastic portion 296, and a ferromagnetic member 270 formed in a ring-like shape, having a shape of a section substantially in an H-like shape in a section thereof in the axial direction. In details, the second second portion 226 includes two circular plate portions substantially having the same shape extended in the diameter direction, and a connecting portion of connecting the two circular plate portions. The two circular plate portions are arranged to be spaced apart from each other by an interval therebetween in the axial direction substantially in a parallel state to substantially overlap in the axial direction. On the other hand, the connecting portion is provided with a shape substantially in a circular cylinder shape. The connecting portion connects a center portion in a diameter direction of the circular plate portion on one side and a center portion in a diameter direction of the circular plate portion on other side.

A portion on an inner side in the diameter direction of the connecting portion of the circular plate portion on one side (circular plate portion on inner side in axial direction) is fitted to and fixed by the second portion fixing groove on other side of the inner ring 202, and an inner peripheral face of the connecting portion is brought into contact with an outer peripheral face portion of the inner ring 202 disposed on an outer side in the axial direction of the other second portion fixing groove of the inner ring 202. A portion on an outer side in the diameter direction of the circular plate portion on one side constitutes the sliding contact portion 297 made of a metal. The sliding contact portion 297 made of a metal is fixedly attached to the elastic portion 296 such that a portion fitted to the second portion fixing groove on other side and the connecting potion are integrated. Further, an end face in the axial direction on a side of the connecting portion of a portion on an inner side in the diameter direction of the connecting portion of the circular plate portion on other side is brought into contact with an end face on one side in the axial direction of the inner ring 202.

The ferromagnetic member 270 arranged in a ring-like shape along a peripheral direction of the second second portion 226 is embedded in and fixed by an end portion on an outer side in the diameter direction and on an inner side in the axial direction of the circular plate portion on other side of the second second portion 226.

As shown by FIG. 3, an end portion on an inner side in the diameter direction of the second first portion 225 is contained in a recess portion on an outer side in the diameter direction of the second second portion 226. The bimetal member 245 of the second first portion 225 is bent to an inner side in the axial direction at the normal temperature region (20° C.±15° C.).

As shown by FIG. 3, a portion on an inner side in the axial direction of an end portion on an inner side in the diameter direction of the second first portion 225 is brought into contact with an end face of a portion on an inner side in the axial direction of the second second portion 226 specifying the recess portion in the normal temperature region. The portion on the inner side in the axial direction of the end portion on the inner side in the diameter direction of the second first portion 225 is brought into contact with an end face on an outer side in the axial direction of the sliding contact portion 297 made of a metal.

The control box 209 includes a microcomputer and a current driver, and the current driver is electrically connected to the electromagnet 230 of the first first portion 205 and the electromagnet 240 of the second first portion 225 by a wiring.

In the above-described constitution, when the microcomputer recognizes rotation of the inner ring 202 relative to the outer ring 201 by receiving a signal from a rotational speed sensor, not illustrated, the microcomputer makes the current driver supply a current to the electromagnets 230, 240.

Then, an attractive force by a magnetic force is operated between the electromagnet 230 and the ferromagnetic member 260 and an attractive force by a magnetic force is operated between the electromagnet 240 and the ferromagnetic member 270.

Further, when the current is supplied into the first first portion and the second first portion 205, 225 and temperatures at inside of the first first portion and the second first portion 205, 225 become higher than a normal temperature, the bimetal members 235 and 245 are respectively deformed to outer sides in the axial direction.

A resultant force of the forces is operated to the elastic portion made of rubber of the first first portion 205, the first first portion 205 is deformed as shown by a dotted line in FIG. 3, and the first first portion 205 is brought into noncontact with the first second portion 206. Further similarly, a resultant force of the forces is operated to the elastic portion made of rubber of the second first portion 225, the second first portion 225 is deformed as shown by a dotted line in FIG. 3, and the second first portion 225 is brought into noncontact with the second second portion 226.

The electromagnet 230 constitutes a current supplied portion, further, the electromagnet 230, the ferromagnetic member 260, the bimetal member 235 and the elastic portion of the first first portion 205 constitute an interval adjusting portion. Further, similarly, the electromagnet 240 constitutes the current supplied portion, further, the electromagnet 240, the ferromagnetic member 270, the bimetal member 245 and the elastic portion of the second first portion 225 constitute an interval adjusting portion.

Further, the sealing device of the third embodiment includes two temperature sensors (not illustrated). The temperature sensors are thermocouples and according to the thermocouple on one side, a high temperature end of the thermocouple is fixedly attached to the bimetal member 235. The microcomputer of the control box calculates a temperature of the bimetal member 235 by measuring an electromotive force between two low temperature ends of the thermocouple on one side.

When the temperature of the bimetal member 235 becomes a temperature equal to or higher than a predetermined temperature, even when the attractive force by the magnetic force operated between the electromagnet 230 and the ferromagnetic member 260 is 0, the first first portion 205 and the first second portion 206 are separated only by a force owing to deformation of the bimetal member 235.

The microcomputer makes the current supplied to the electromagnet 230 by the current driver 0 when the temperature of the bimetal member 235 is brought into a temperature region equal to or higher than the predetermined temperature.

Further, similarly, according to the thermocouple on other side, a high temperature end of the thermocouple is fixedly attached to the bimetal member 245. The microcomputer of the control box calculates a temperature of the bimetal member 245 by measuring an electromotive force between two low temperature ends of the thermocouple on other side.

When the temperature of the bimetal member 245 becomes a temperature equal to or higher than a predetermined temperature, even when the attractive force by the magnetic force operated between the electromagnet 240 and the ferromagnetic member 270 is 0, the second first portion 225 and the second second portion 226 are separated only by a force owing to deformation of the bimetal member 245.

The microcomputer makes the current supplied to the electromagnet 240 by the current driver 0 when the temperature of the bimetal member 245 is brought into a temperature region equal to or higher than the predetermined temperature.

According to the sealing device of the third embodiment, whereas when a machine tool having a ball bearing apparatus having the sealing device is operated, the first portion 205 and the second portion 206 as well as the first portion 225 and the second portion 226 are pulled apart to be brought into non-contact with each other by attracting the electromagnets 230, 240 to the ferromagnetic member portions 260, 270 by supplying currents to the electromagnets 230, 240, distances between the first portion 205 and the second portion 206 as well as the first portion 225 and the second portion 226 can be made to be null by releasing attractive forces between the electromagnets 230, 240 and the ferromagnetic members 260, 270 by stopping to supply currents to the electromagnets 230, 240 when the machine tool is stopped. Therefore, a torque in operating the machine tool can be reduced, at the same time, when the machine tool is stopped, a foreign matter can remarkably be restrained from invading inside from outside.

Further, according to the sealing device of the third embodiment, when the temperature rises, whereas the first first portion 205 is moved in a direction of increasing an interval from the sliding contact portion 292 made of a metal owing to warp of the bimetal members 235, 245 to outer sides in the axial direction, the second first portion 225 is moved in a direction of increasing an interval from the sliding contact portion 297. Therefore, when a machine having the sealing device is operated, by utilizing temperature rises of the bimetal members 235, 245, there can be promoted a function of enlarging the interval between the portion on the inner side in the axial direction of the end portion on the inner side in the diameter direction of the first first portion 205 and the end face on the outer side in the axial direction of the sliding contact portion 292 made of a metal as well as the interval between the portion on the inner side in the axial direction of the end portion on the inner side in the diameter direction of the second first portion 225 and the end face on the outer side in the axial direction of the sliding contact portion 297 made of a metal.

Further, according to the sealing device of the third embodiment, when the temperatures of the bimetal members 235, 245 are brought into the temperature regions equal to or higher than the predetermined temperature, the currents supplied to the first portions 205, 225 can be reduced, and therefore, the running cost can be reduced.

Further, although according to the third embodiment, when the microcomputer determines that the temperatures of the bimetal members 235, 245 are higher than the predetermined temperature, the microcomputer controls the current driver such that the currents supplied to the electromagnets 230, 240 become 0, according to the invention, when the microcomputer determines that the temperature of the bimetal member is higher than the predetermined temperature, the microcomputer may control the current supplied to the electromagnet by the current driver to a current ($>0$ [A]) smaller than the current supplied to the electromagnet by the current driver when the temperature of the bimetal member is lower than the predetermined temperature.

Further, although according to the third embodiment, when the machine tool which does not supply the currents to the electromagnets 230, 240 is stopped, the first portions 205, 225 and the second portions 205, 226 are brought contact with each other, according to the invention, when the machine tool which does not supply the currents to the electromagnets is stopped, the first portions, 205, 225 may be disposed to be spaced apart from the second portions 206, 226 by intervals therebetween.

Further, although according to the third embodiment, the first portion and the second portion are disposed to be spaced apart from each other at the temperature of the sealing device equal to or higher than the predetermined temperature, according to the invention, the first portion may be brought into contact with the second portion even when the temperature of the sealing device is any temperature.

In the case of the modified example, the contact face pressure or the contact area of the first portion to the second portion at a high temperature state can be reduced. Therefore, wear of a seal lip can be restrained and a value of a torque can be reduced in a high temperature state.

Further, although according to the third embodiment, the sealing apparatus is used as a sealing apparatus of a rolling bearing in which the rolling element is a ball 204, the sealing device of the invention may be used as a sealing device of a rolling bearing apparatus in which a rolling member is other than a ball of a circular cone roller, a circular cylinder roller, a barrel shape roller (projected face roller), a needle or the like. Further, the sealing device of the invention may be used as a sealing device of a linear apparatus.

Further, although according to the third embodiment, the sealing devices of the invention are arranged on both sides of the ball 204 in the axial direction, according to the invention, the sealing device of the invention may be arranged only on one side of the rolling member in the axial direction.

Further, although according to the third embodiment, the outer ring 201 is constituted by a stationary ring and the inner ring 202 is constituted by a rotating ring, according to the invention, the outer ring may be constituted by a rotating ring and the inner ring may be constituted by a stationary ring.

Further, although according to the third embodiment, the bimetal members 235, 245 are respectively constituted by the two portions having linear expansion coefficients different from each other, according to the invention, the bimetal member may be constituted by three or more portions having linear expansion coefficients different from each other.

Further, although according to the third embodiment, the temperature sensor is provided, and the value of the current supplied by the current driver is varied based on a temperature detected by the temperature sensor, according to the invention, the temperature sensor may be omitted.

Further, although according to the third embodiment, the value of the current supplied by the current driver is varied by the temperature, according to the invention, the value of the current supplied by the current driver may be varied based on a rotational speed of the inner ring relative to the outer ring.

Further, although according to the third embodiment, the electromagnet 230 constitutes the current supplied portion, further, the electromagnets 230, 240, the ferromagnetic members 260, 270, the bimetal member 235, 249 and the elastic portions of the first portions 205, 225 constitute the interval adjusting portion.

However, according to the invention, the electromagnet may be omitted from the first portion, the first portion may be arranged with a resistor comprising, for example, a nichrome wire as a current supplied portion, further, the ferromagnetic member may be omitted from the second portion. Further, the interval between the first portion and the second portion may be adjusted by heating the bimetal member by Joule's heat generated from the resistor comprising the nichrome wire or the like. Further, in this case, naturally, the resistor comprising the nichrome wire or the like constitutes the current supplied portion, further, the resistor comprising the nichrome wire or the like, the bimetal member and the elastic portion of the first portion constitute the interval adjusting portion.

Figure 4:
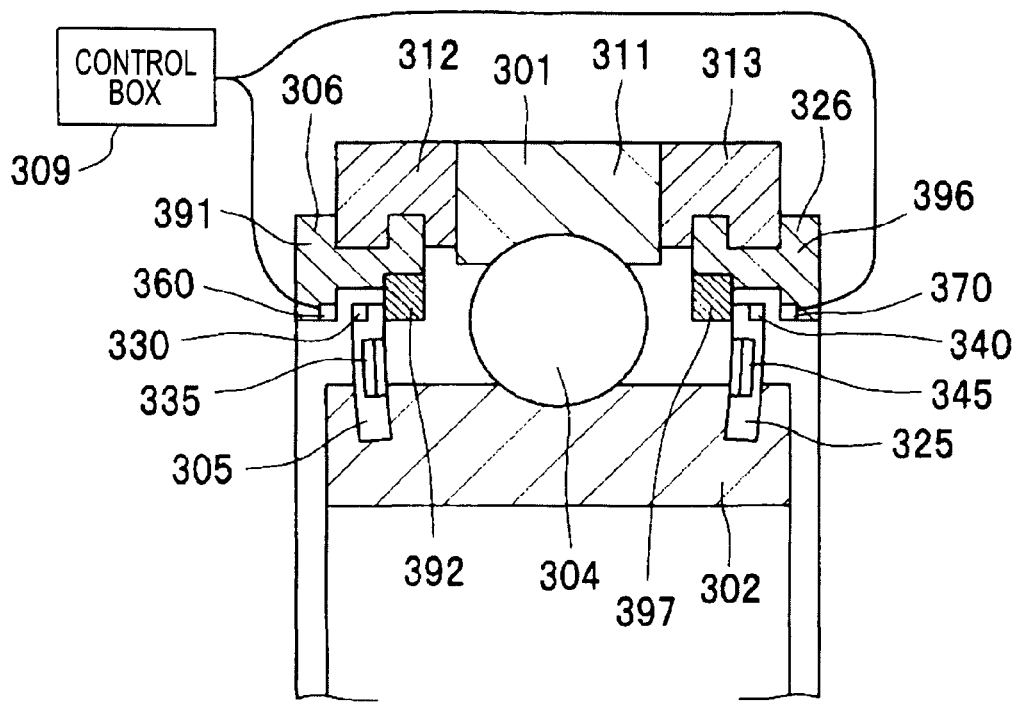
FIG. 4 is a schematic sectional view in an axial direction of a ball bearing apparatus according to a fourth embodiment of the invention.

FIG. 4 is a schematic sectional view in an axial direction of a ball bearing apparatus according to a fourth embodiment of the invention.

The fourth embodiment differs from the third embodiment in that a member having a section in an H-like shape is fixed to a first raceway member, an electromagnet is embedded to be fixed to the member having the section in the H-like shape instead of embedding to fix the ferromagnetic member thereto.

According to the ball bearing apparatus of the fourth embodiment, constitution portions the same as the constitution portions of the ball bearing apparatus of the third embodiment are attached with the same reference numerals and an explanation thereof will be omitted. Further, according to the ball bearing apparatus of the fourth embodiment, an explanation will be omitted of an operation and an effect and a modified example common to those of the ball bearing apparatus of the third embodiment, and an explanation will be given only of a constitution, an operation and an effect and a modified example different from those of the ball bearing apparatus of the third embodiment.

The ball bearing apparatus includes an outer ring 301 as a first raceway member, an inner ring 302 as a second raceway member, a plurality of balls 304, a first second portion 305, a second second portion 325, a first first portion 306, a second first portion 326 and a control box 309.

The outer ring 301 includes an outer ring main body 311 in a ring-like shape and substantially in a circular cylinder shape, a first sealing device fixing member 312 in a ring-like shape and substantially in a circular cylinder shape, and a second sealing device fixing member 313 in a ring-like shape and substantially in a circular cylinder shape. The first sealing device fixing member 312 is the same as the second sealing device fixing member 313. An end face on one side in an axial direction of the first sealing device fixing member 312 is brought into contact with an end face on other side in the axial direction of the outer ring member 311, and an end face on other side in the axial direction of the second sealing device fixing member 313 is brought into contact with an end face on one side in the axial direction of the outer ring main body 311.

The first sealing device fixing member 312 and the second sealing device fixing member 313 are respectively fixed to the outer ring main body 311 by a fastening member of a bolt (not illustrated) or the like. Whereas the outer ring main body 311 includes a raceway groove as an example of a raceway surface at an inner periphery thereof, the first sealing device fixing member 312 and the second sealing device fixing member 313 respectively include first portion attaching grooves in a ring-like shape.

The first first portion 306 is a ring-like member, including an elastic portion 391 made of rubber constituting a main body portion, a sliding contact portion 392 in a ring-like shape and made of a metal fixed to the elastic portion 391, an electromagnet 360 arranged substantially in a ring-like shape along a peripheral direction of the first first portion 306, and is provided with a shape of a section substantially in an H-like shape at a section thereof in the axial direction. In details, the first first portion 306 includes two circular plate portions substantially having the same shape extended in the diameter direction and a connecting portion connecting the two circular plate portions. The two circular plate portions are arranged to be spaced apart from each other by an interval therebetween in the axial direction substantially in a parallel state and substantially overlapping substantially in the axial direction. On the other hand, the connecting portion is provided with a shape of substantially a circular cylinder shape. The connecting portion connects a center portion in a diameter direction of the circular plate portion on one side and a center portion in the diameter direction of the circular plate portion on other side.

A portion on an outer side in the diameter direction of the connecting portion of the circular plate portion on one side (circular plate portion on inner side in the axial direction) is fitted to be fixed to the first portion fixing groove of the first sealing device fixing member 312, and an outer peripheral face of the connecting portion is brought into contact with an inner peripheral face portion of the first sealing device fixing member 312 disposed on an outer side in the axial direction of the first portion fixing groove of the first sealing device fixing member 312. A portion on an inner side in the diameter direction of the circular plate portion on one side constitutes the sliding contact portion 392 made of a metal. The sliding contact portion 392 made of a metal is fixedly attached to the elastic portion 391 such that a portion fitted to the second portion fixing groove on one side and the connecting portion are integrated. Further, an end face in the axial direction on a side of the connecting portion of an outer portion in the diameter direction of the connecting portion of the circular plate portion on other side (circular plate portion on outer side in axial direction) is brought into contact with an end face on other side in the axial direction of the first sealing device fixing member 312.

The electromagnet 360 is embedded in and fixed by an end portion on an inner side in the diameter direction and an inner side in the axial direction of the circular plate portion on other side of the first first portion 306.

On the other hand, the second first portion 326 is a ring-like member, including an elastic portion 396 made of rubber constituting a main body portion, a sliding contact portion 397 in a ring-like shape and made of a metal fixed to the elastic portion 396, and an electromagnet 370 arranged substantially in a ring-like shape along a peripheral direction of the second first portion 326, having a shape of a section substantially in an H-like shape at a section in the axial direction. In details, the second first portion 326 includes two circular plate portions substantially in the same shape extended in the diameter direction, and a connecting portion connecting the two circular plate portions. The two circular plate portions are arranged to be spaced apart from each other by an interval therebetween in the axial direction substantially in a parallel state and substantially overlapping substantially in the axial direction. On the other hand, the connecting portion is provided with a shape substantially in a circular cylinder shape. The connecting portion connects a center portion in the diameter direction of the circular plate portion on one side and a center portion in the diameter direction of the circular plate portion other side.

A portion on an outer side in the diameter direction of the connecting portion of the circular plate portion on one side (circular plate portion on inner side in axial direction) is fitted to be fixed to the first portion fixing groove of the second sealing device fixing member 313, and an outer peripheral face of the connecting portion is brought into contact with an inner peripheral face portion of the second sealing device fixing member 313 disposed on an outer side in the axial direction of the first portion fixing groove of the second sealing device fixing member 313. A portion on an inner side in the diameter direction of the circular plate portion on one side constitutes the sliding portion made of a metal. The sliding contact portion 397 made of a metal is fixedly attached to the elastic portion 396 such that a portion thereof fitted to the second portion fixing groove on one side and the connecting portion are integrated. Further, an end face in the axial direction on a side of the connecting portion of a portion on an outer side in the diameter direction of the connecting portion of the circular plate portion on other side (circular plate portion on other side in axial direction) is brought into contact with an end face on one side in the axial direction of the second sealing device fixing member 313.

The electromagnets 370 is embedded in and fixed by an end portion on an inner side in the diameter direction on an inner side in the axial direction of the circular plate portion on other side of the second first portion 326.

The inner ring 302 includes a raceway groove as an example of a raceway face and two second portion fixing grooves on an outer peripheral face thereof. Whereas the second portion fixing groove on one side is disposed on one side in the axial direction of the raceway groove, the second portion fixing groove on other side is disposed on other side in the axial direction of the raceway groove.

A first second portion 305 includes an elastic portion made of rubber formed in a ring-like shape and constituting a main body portion, a ferromagnetic member 330 in a ring-like shape, and a bimetal member 335 in a ring-like shape, the ferromagnetic member 330 and the bimetal member 335 are respectively embedded in and fixed by an elastic portion made of rubber substantially concentrically with the elastic portion made of rubber.

As shown by FIG. 4, the ferromagnetic member 330 is embedded in and fixed by an inner side in the diameter direction and an outer side in the axial direction of the first second portion 305.

On the other hand, the bimetal member 335 is constituted by bonding a low expansion member and a high expansion member in shapes of plates having different thermal expansion coefficients. Whereas the low expansion member is constituted by a low expansion material of, for example, 36 through 46% Ni—Fe alloy or the like, the high expansion member is constituted by a high expansion material of, for example, Cu, Ni, 70% Cu—Zn, 70% Cu—Zn alloy, 20% Ni—Mn—Fe alloy, Ni—Cr—Fe alloy, 20% Ni—Mo—Fe alloy, 70% Mn—Ni—Cu alloy or the like. An expansion degree of the bimetal member 335 can be changed by changing respective metal compositions of the low expansion member and the high expansion member to be bonded. The bimetal member 335 is gradually opened by thermal expansion in accordance with a temperature to exert a force to the first second portion 305. The high expansion member and the low expansion member are respectively ring-like members and extended substantially in the diameter direction of the inner ring 302.

The bimetal member 335 is constituted by bonding an end face in the axial direction of the high expansion member and an end face in the axial direction of the low expansion member. The bimetal member 235 is arranged on an inner side in the diameter direction of the ferromagnetic member 330. The low expansion member constitutes a first thermal expansion member, and a high expansion member constitutes a second thermal expansion member.

As shown by FIG. 4, an end portion on an outer side in the diameter direction of the first second portion 305 is contained in a recess portion on an inner side in the diameter direction of the first first portion 306 having a section substantially in the H-like shape. The bimetal member 335 of the first second portion 305 is made to be extended substantially in the diameter direction at a low temperature region (20° C.±15° C.)

As shown by FIG. 4, a portion on an inner side in the axial direction of an end portion on an outer side in the diameter direction of the first second portion 305 is brought into contact with an end face on an inner side in the axial direction of the sliding contact portion 392 made of a metal at the normal temperature region.

The second second portion 325 includes an elastic portion mad of rubber formed in a ring-like shape and constituting a main body portion, a ferromagnetic member 340 in a ring-like shape, and a bimetal member 345 in a ring-like shape, and the ferromagnetic member 340 and the bimetal member 345 are respectively embedded in and fixed by the elastic portion made of rubber substantially concentrically with the elastic portion made of rubber.

As shown by FIG. 4, the ferromagnetic member 340 is embedded in and fixed by an outer side in the diameter direction and an outer side in the axial direction of the second second portion 325.

On the other hand, the bimetal member 345 is constituted by bonding a low expansion member and a high expansion member in shapes of plates having different thermal expansion coefficients. Whereas the low expansion member is constituted by a low expansion material of, for example, 36 through 46% Ni—Fe alloy or the like, the high expansion member is constituted by a high expansion material of, for example, Cu, Ni, 70% Cu—Zn, 70% Cu—Zn alloy, 20%

Ni—Mn—Fe alloy, Ni—Cr—Fe alloy, 20% Ni—Mo—Fe alloy, 70% Mn—Ni—Cu alloy or the like. An expansion degree of the bimetal member 345 can be changed by changing respective metal compositions of the low expansion member and the high expansion member to be bonded. The bimetal member 345 is gradually opened by thermal expansion in accordance with a temperature to exert a force to the second second portion 325. The high expansion member and the low expansion member are respectively ring-like members and extended substantially in the diameter direction of the inner ring 302.

The bimetal member 345 is constituted by bonding an end face in the axial direction of the high expansion member and an end face in the axial direction of the low expansion member. The bimetal member 345 is arranged on an inner side in the diameter direction of the ferromagnetic member 340. The low expansion member constitutes a first thermal expansion member and the high expansion member constitutes a second thermal expansion member.

As shown by FIG. 4, an end portion on an outer side in the diameter direction of the second second portion 325 is contained in a recess portion on an inner side in the diameter direction of the second first portion 326 having the section substantially in the H-like shape. The bimetal member 345 of the second second portion 325 is made to be extended substantially in the diameter direction at a normal temperature region (20° C.±15° C.).

As shown by FIG. 4, a portion on an inner side in the axial direction of an end portion on an outer side in the diameter direction of the second second portion 325 is brought into contact with an end face on an inner side in the axial direction of the second first portion 326 specifying the recess portion at a normal temperature region. The portion on the inner side in the axial direction of the end portion on the outer side in the diameter direction of the second second portion 325 is brought into contact with an end face on an outer side in the axial direction of the sliding contact portion 397 made of a metal.

The control box 309 includes a microcomputer and a current driver, and the current driver is electrically connected to the electromagnet 360 of the first first portion 306 and the electromagnet 370 of the second first portion 326 by a wiring.

In the above-described constitution, when the microcomputer recognizes rotation of the inner ring 302 relative to the outer ring 301 by receiving a signal from a rotational speed sensor, not illustrated, the microcomputer makes the current driver supply currents to the electromagnets 360, 370.

Then, an attractive force by a magnetic force is operated between the electromagnet 360 and the ferromagnetic member 330 and an attractive force by a magnetic force is operated between the electromagnet 370 and the ferromagnetic member 340.

Further, when the ball bearing apparatus is brought into an operating state (currents are supplied into the first first portion and the second first portion 306, 326), and temperatures in the first second portion and the second second portion 305, 325 become higher than a normal temperature, the bimetal members 335 and 345 are respectively bent to outer sides in the axial direction.

A resultant force of the forces is operated to the elastic portion made of rubber of the first second portion 305, the elastic portion is deformed, and the first second portion 305 is brought into noncontact with the first first portion 306. Further, similarly, a resultant force is operated to the elastic portion made of rubber of the second second portion 325, the elastic portion is deformed, and the second second portion 325 is brought into noncotact with the second first portion 326.

The electromagnet 360 constitutes a current supplied portion, further, the electromagnet 360, the ferromagnetic member 330, the bimetal member 335 and the elastic portion of the first second portion 305 constitute an interval adjusting portion. Further, similarly, the electromagnet 370 constitutes a current supplied portion, further, the electromagnet 370, the ferromagnetic member 340, the bimetal member 345 and the second second portion 325 constitute the interval adjusting portion.

Further, the sealing device of the fourth embodiment includes two temperature sensors (not illustrated). The temperature sensors are thermocouples, and according to the thermocouple on one side, a high temperature region of the thermal couple is fixedly attached to the bimetal member 335. The microcomputer of the control box is made to calculate the temperature of the bimetal member 335 by measuring an electromotive force between two low temperature ends of the thermocouple on one side.

When the temperature of the bimetal member 335 becomes a temperature equal to or higher than a predetermined temperature, even when an attractive force by a magnetic force operated between the electromagnet 360 and the ferromagnetic member 330 becomes 0, the first first portion 306 and the first second portion 305 are made to be separated only by a force owing to deformation of the bimetal member 335.

The microcomputer makes the current supplied to the electromagnet 360 by the current driver 0 when the temperature of the bimetal member 335 becomes a temperature equal to or higher than the predetermined temperature.

Further, similarly, according to the thermocouple on other side, a high temperature end of the thermocouple is fixedly attached to the bimetal member 345. The microcomputer of the control box calculates the temperature of the bimetal member 345 by measuring an electromotive force between two low temperature ends of the thermocouple on other side.

When the temperature of the bimetal member 345 becomes a temperature equal to or higher than a predetermined temperature, even when an attractive force by a magnetic force operated between the electromagnet 370 and the ferromagnetic member 340 becomes 0, the second first portion 326 and the second second portion 325 is made to be separated only by a force owing to deformation of the bimetal member 345.

The microcomputer makes the current supplied to the electromagnet 370 by the current driver 0 when the temperature of the bimetal member 345 becomes the temperature equal to or higher than the predetermined temperature.

Also according to the sealing device of the fourth embodiment, similar to the third embodiment, whereas when the temperature of the ball bearing apparatus is brought to the normal temperature region, the first portion 306 and the second portion 305, and the first portion 326 and the second portion 325 are brought into contact with each other, when the temperature of the ball bearing apparatus is equal to or higher than the predetermined temperature equal to or higher than the normal temperature region, the first portions 306, 326 and the second portions 305, 325 are disposed by being spaced apart from each other by intervals therebetween. In this way, low torque formation in operating and prevention of invasion of a foreign matter from outside when the apparatus is stopped are simultaneously realized.

Further, when a grease is filled in a region to be sealed by the sealing device of the invention as a lubricant, as a thicker of the grease, for example, barium soap, lithium compound soup or the like can be used.

Further, an embodiment combined with at least two embodiments of the first embodiment through the third embodiment is naturally included in a category of the invention. For example, the sealing device may naturally include both of the electromagnet and the piezoelectric element.

What is claimed is:

1. A sealing device comprising:
   a current supplied portion; and
   an interval adjusting portion for adjusting an interval between a first portion and a second portion by making the current supplied portion conductive or nonconductive
   wherein an interval between the first portion and the second portion in making the current supplied portion conductive is larger than an interval between the first portion and the second portion in making the current supplied portion nonconductive,
   wherein the interval adjusting portion includes a bimetal member constituted by bonding a first expansion member in a plate-like shape having a first thermal expansion coefficient and a second expansion member in a plate-like shape having a second thermal expansion coefficient different from the first thermal expansion coefficient and constituting a portion of at least one of the first portion and the second portion,
   wherein the bimetal member is deformed to increase the interval between the first portion and the second portion when a temperature of the bimetal member is elevated, the sealing device further including:
      a temperature measuring portion of measuring the temperature of the bimetal member, and
   wherein a current supplied to the current supplied portion when the temperature measured by the temperature measuring portion is smaller than a predetermined temperature is larger than a current supplied to the current supplied portion when the temperature measured by the temperature measuring portion is equal to larger than the predetermined temperature.

2. The sealing device according to claim 1, wherein the current supplied portion includes an electromagnet constituting at least a portion of the first portion,
   wherein the interval adjusting portion includes the electromagnet, a ferromagnetic member constituting at least a portion of the second portion, and an elastic portion constituting a portion of at least one of the first portion and the second portion.

3. The sealing device according to claim 1, wherein the current supplied portion includes a piezoelectric element constituting a portion of the first portion,
   wherein the interval adjusting portion includes the piezoelectric element.

4. A rolling bearing apparatus comprising:
   a first raceway member including a raceway surface;
   a second raceway member including a raceway surface;
   a plurality of rolling elements arranged between the raceway surface of the first raceway member and the raceway surface of the second raceway member; and
   a sealing device according to claim 1;
   wherein the first portion constitutes a portion of the first raceway member or fixed to the first raceway member, and
   wherein the second portion constitutes a portion of the second raceway member, or fixed to the second raceway member.

* * * * *